United States Patent Office 3,195,417
Patented July 20, 1965

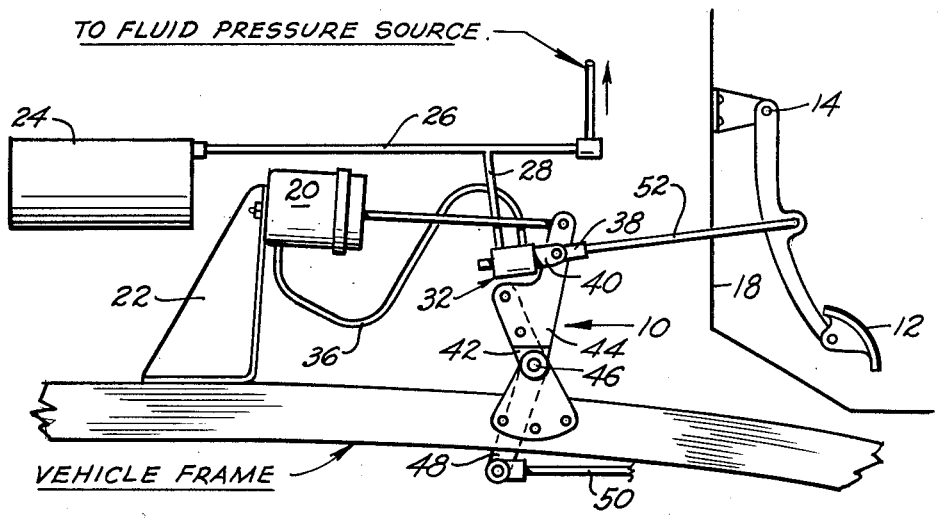
FIG_1
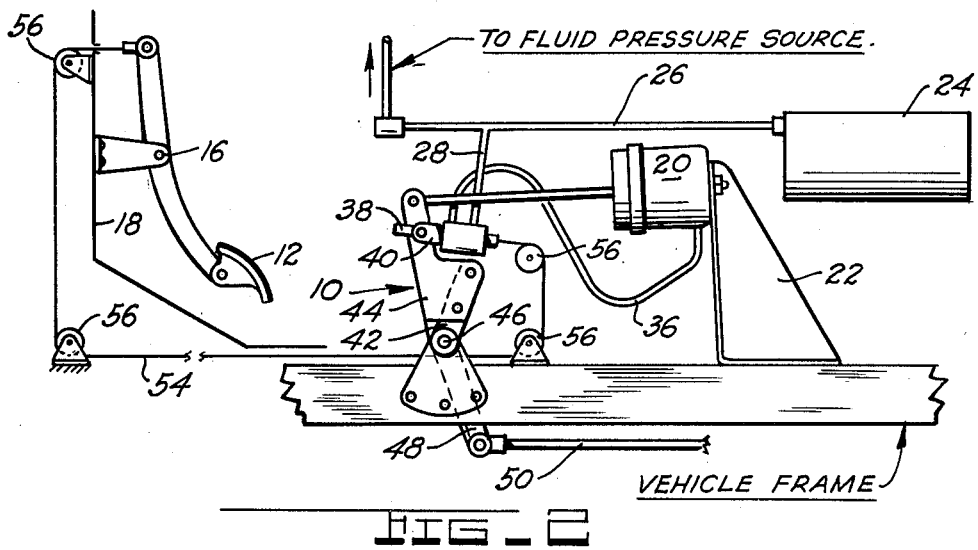
FIG_2
ROBERT R. HAGER.
C. ROBERT KENRICK.
INVENTORS
BY
ATTORNEY.

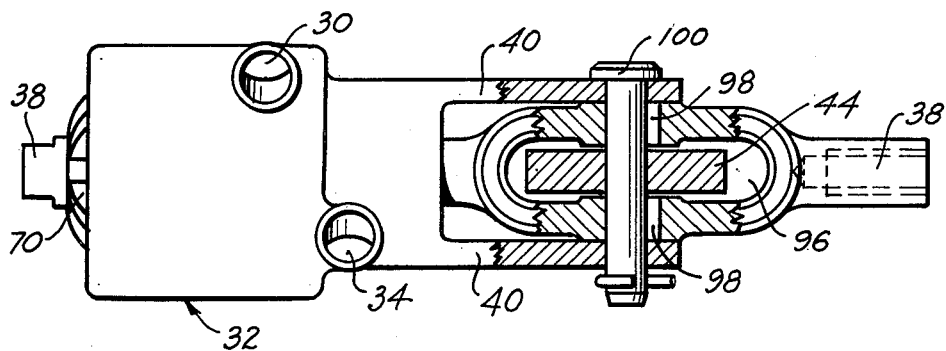
FIG_4
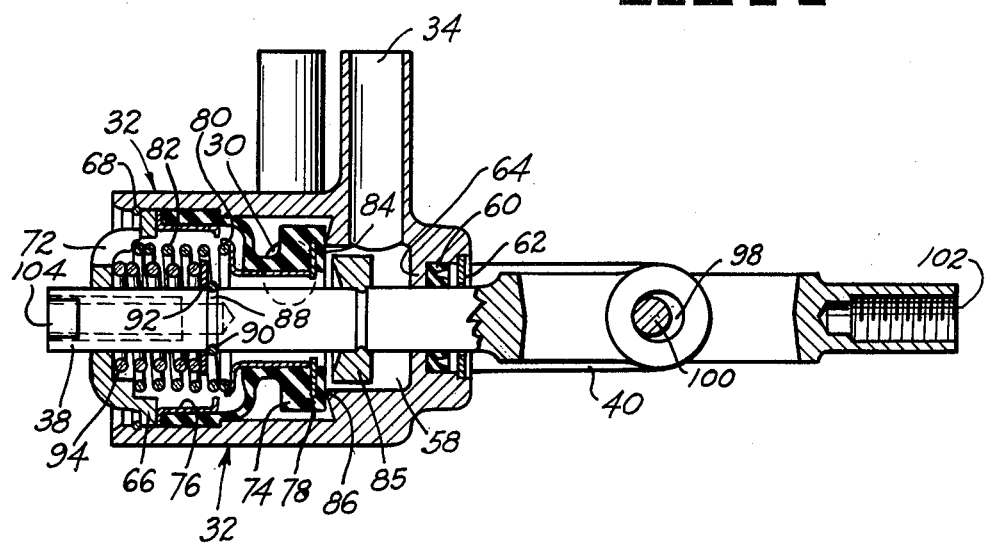
FIG_3
ROBERT R. HAGER
C. ROBERT KENRICK.
INVENTORS
BY
Richard G Geib
ATTORNEY.

3,195,417
REVERSIBLE VALVE AND SERVOMOTOR
Robert R. Hager and Charles Robert Kenrick, South Bend, Ind., assignors to The Bendix Corporation, South Bend, Ind., a corporation of Delaware
Filed Nov. 30, 1962, Ser. No. 241,384
6 Claims. (Cl. 91—374)

This invention relates to a valve which may be operated by a pushing or a pulling force on a valve control rod. In addition, this invention proposes to connect a valve in a control system in such a manner as to enable mechanical override of the valve without increasing valve operating forces on the body of the valve.

The ever increasing desire to provide more ease in operation of controls has led to many types of power assist devices. At the same time industry has been conscious of how to maintain control regardless of whether the power assist devices were operative. Most devices heretofore have merely provided means of follow-through which have imposed large loads on the valving for such power assist devices. It is our principal intent to provide manual control means for such power assist systems which does not impose any greater force on the valve than that required to operate it during power assist control.

It is also an object of our invention to provide a universal valve which may be either push or pull operated.

A still further object of our invention is to provide a lost-motion connection between a manually operated member, a valve and a movable lever to first allow the manually operated member to first work the valve and secondly mechanically connect the manually operated member and the movable lever such that the valve body does not receive further forces applied to the manually operated member.

As may be readily understood by those skilled in the art to which our invention relates, further objects and advantages may be derived from the following description of the accompanying drawings in which:

FIGURE 1 is a schematic presentation of a control system employing our valve such that it is push operated;

FIGURE 2 is a schematic presentation of a control system employing our valve such that it is pull operated;

FIGURE 3 is a sectioned side view of a form of our valve; and

FIGURE 4 is a plan view of our valve whose housing and control rod are partially sectioned to show a proposed connection with a lever or the like employing a preferred lost motion means.

With more particular regard to FIGURES 1 and 2, it is to be understood that like numerals in all cases refer to like parts. In detail, FIGURE 1 relates to a typical installation of our valve in a vehicle such that it has a forward push operated engine compartment; whereas FIGURE 2 relates an installation of our valve in a vehicle such that the valve is pull operated, as may be experienced in front and/or rear engined vehicles, respectively.

We have preferred, for obvious reasons, to show our invention as it would be employed in a power assist clutch control system for a motor vehicle. We, however, do not entend to be limited to such for we have also contemplated other uses; i.e., as a power brake control valve, as a power system control valve for an aircraft control system and the like.

Referring now to both FIGURES 1 and 2, we show a clutch control system 10 having a clutch pedal 12 pivoted, as at 14 in FIGURE 1 or as at 16 in FIGURE 2, to a bulkhead 18 forming the forward wall of a passenger compartment in the vehicle.

As for the power assist system for both types of vehicles we propose to mount a power unit 20 to the vehicle frame, as by a mounting bracket 22. In addition we show a fluid pressure reserve tank 24 connected, as shown, to a fluid pressure source. One form of power which can be derived for such systems is vacuum, and in such cases the reserve tank would be connected through conduit 26 to the intake manifold of an internal combustion engine (not shown). Our system, however, could just as well be utilized with other types of power such as, for example, with compressed air or the like, whereupon line 26 would be connected to a pump or compressor, as the case may be.

In any event, conduit 26 is communicated, as by branch conduit 28, to an inlet port 30, see FIGURES 3 and 4, of a valve housing 32. The valve housing is also provided with an outlet port 34 to which a conduit 36 is attached. Conduit 36 communicates the outlet port 34 with the power unit or servomotor 20.

We then propose to connect both the power unit and a valve control rod 38 of the valve 32 as well as a pair of bifurcated ears 40 of the valve housing 32 to a bellcrank upper leg 42 as by an adapter 44. The bellcrank is in turn revolvably mounted on a rock shaft 46, and has a downwardly projecting leg 48 connected, as by link 50, to a clutch throw-out bearing (not shown).

As for the connection between the clutch pedal 12 and the valve control rod 38, we show a push rod 52 in FIGURE 1 and a cable 54 in FIGURE 2 which, as seen by comparing the FIGURES 1 and 2 are connected at opposite ends of the valve control rod 38. In the cable system, such as may be utilized in rear engine placement in vehicles or where the clutch, transmission and differential are located in the rear of the vehicle, pulleys 56 are provided to guide the cable 54, which pulleys are revolvably mounted to surrounding vehicle structure.

As for our valve construction, we now refer to FIGURES 3 and 4. As seen the valve housing can be made of metal or due to the light loading applied thereto, one could manufacture housing 32 of plastic which would enable a major cost reduction as well as permit an easier fabrication. In any event, the housing 32 is formed, machined or otherwise fabricated with a chamber 58 open at both ends. At the right end, as seen in FIGURE 3, we provide a guide seal structure 60 which aids in reciprocally mounting the valve control rod 38 to project from the open end of chamber 58. A retaining ring 62 is utilized to hold guide seal structure 60 against a shoulder 64 formed in chamber 58 with housing 32. At the opposite end of chamber 58 an end plate 66 is provided and is held within the chamber of housing 32 by a retainer ring 68. The end plate is provided with a series of ribs 70 between which are openings 72 communicating chamber 58 with the surrounding atmosphere. The end plate is also bored to slidably receive the left end of the valve control rod 38 whereupon rod 38 is slidably held at each end of chamber 58.

Behind the end plate 66 within the chamber 58 an annular valve member 74 is held against the chamber walls by an annular retainer member 76. As may be understood by those skilled in the art the retainer member may be formed integrally with end plate 66 as a manufacturing expedient. The valve 74 is stiffened by a ring member 78 which projects inwardly of valve 74 toward the valve center. A spring retainer 80 is fitted within the annular valve 74 to have one end abutting the ring 78, and a light spring 82 is compressed upon assembling the valve between the end plate 66 and the spring retainer 80 to bias the valve 74 to the right where valve face 84 is lapped on a valve seat 86 formed with the housing 32 in chamber 58.

The valve control rod 38 is provided with a valve operating member 85 within the chamber 58, which operating member may be keyed to rod 38 or formed as an integral part thereof, as may be appreciated by those skilled in the art. In addition, rod 38 is grooved, as at 88, to receive a retainer ring 90 forming a stop for a spring retainer plate 92. A feel spring 94 is biased between plate 66 and plate 92 to provide resistance to movement of rod 38 tending to remove valve face 84 from seat 86. Normally, the valve operating member 85 is held out of contact with valve face 84 to allow fluid communication of the outlet port 34 with the surrounding atmosphere via the openings 72 in end plate 66.

The valve rod 38 is bifurcated adjacent the right side of the valve housing 32, as viewed in the figures, so that an opening 96 is formed along the axis of rod 38. The bifurcated sides of rod 38 are arranged to be contained by the bifurcated ears 40 of the housing 32. Furthermore, rod 38 is provided with an elongated opening 98 which, when the valve housing, valve member and valve rod are assembled, mates with a drilled opening in ears 40 and an opening in adaptor 44 that is projecting upwardly through openings 96 in rod 38. When said openings are aligned a pin 100 joins the ears, the rod, and the adaptor together. This pin also functions as a return stop for the valve and push rod assembly.

If the valve is to be utilized in the manner as presented by FIGURE 1, the push rod 52 is threaded within the bore at the end 102 of rod 38; whereas, if the installation of FIGURE 2 is desired, a cable connector is threaded within a bore at the other end 104 of rod 38.

In operation, and regardless of whether rod 38 is pushed or pulled, the valve face 84 is unseated from seat 86 by member 85 which at the point of engagement with face 84 also closes off atmospheric communication from port 34. As the valve face 84 is unseated the inlet port 30 and the outlet port 34 are in registry. This will then port control fluid to the servomotor 20 via the conduit 36. The servomotor 20 will then pivot the adaptor 44 and bell crank about the rock shaft 46 to move the valve housing 32 until the valve seat 86 again abuts the valve face 84 terminating control fluid to the servomotor 20. If this is not sufficient to operate link 50 to provide clutch operation, the operator strokes the brake pedal 12 further to remove the valve face 84 from the seat 86 in the valve housing 32 until the elongated opening 98 bottoms on the pin 100 connecting the ears 40 of the housing 32 to the adaptor 44. Further movement of rod 38, as by pushing at 102 or pulling at 104, causes the elongated opening 98 to bottom on pin 100. This only occurs when power is insufficient to move adaptor 44 ahead of rod 38. Thus, a mechanical connection is established between rod 38 and adaptor 44 so that further movement of rod 38 will not place forces on valve 74 but instead will go directly through pin 100 into adaptor 44 to mechanically operate the bellcrank.

As this invention is susceptible of many forms other than the specific form described as required by appropriate Patent Statutes, we do not wish to be limited by such description. More particularly, the true scope of my invention is found in the appended claims.

We claim:

1. In a control system having a manual control member and a servomotor for assisting said manual control member in opearting a device, a valve means comprising:
    a housing having an axial chamber open at both ends with an inlet port and an outlet port in communication with said chamber;
    a valve member operatively mounted in said chamber of said housing to separate said inlet port from said outlet port, which valve member also is provided with an opening therethrough to normally allow communication of one of said open ends of said chamber to said outlet port;
    a valve control rod projecting through both open ends, said rod having valve member engaging portions arranged to close said opening and thereafter remove said valve member from a valve seat provided in said chamber on said housing to operate said valve member when said valve control rod is reciprocated within said housing;
    means connecting said valve control rod to said manual control member; and
    a lost motion means to connect said valve control rod to said device to operate said device without utilizing said valve means when said servomotor is inoperative.

2. A valve means according to claim 1 and further comprising a means to resist operation of said valve member to provide feel in said manual control member and to restore said valve member when said manual control member is released.

3. A control system comprising:
    a manually operable device movably mounted;
    a controllable device;
    a means connecting said manually operable device to said controllable device including a push-pull valve having a housing and a valve control rod adapted to operate a valve member within the housing to control a fluid pressure, said valve control rod projecting from both ends of said housing and having connection means at each end for attachment with said manually operable device, said valve control rod being provided with an elongated opening adjacent said connection means at one end;
    a lever operatively connected to said controllable device;
    a servomotor operatively connected to said lever, said servomotor also having a fluid connection with said push-pull valve to receive the fluid pressure controlled by said valve; and
    a pin connecting said push-pull valve control rod to said lever through said elongated opening to provide a lost motion connection between said manually operable device and said lever.

4. For a clutch control system including a clutch pedal, a rock shaft having a bellcrank with a link to a clutch mechanism, and a servo motor for assisting said clutch pedal in operating said clutch, a valve means capable of push and pull operation operatively arranged between said clutch pedal and said bellcrank, which valve means comprises:
    a valve housing having an open end chamber therethrough with a fluid inlet port for receiving a fluid pressure, a fluid outlet port connected with said servomotor to discharge the fluid pressure to operate said servomotor;
    a valve for separating said inlet port from said outlet port;
    a valve control rod operatively connected to said valve which valve connecting rod is provided with connecting means on both ends thereof one of which connecting means is joined to said clutch pedal, said valve connecting rod being further provided with a bifurcation to loosely receive said bellcrank; and
    a lost motion connection joining said bifurcation of said valve control rod to said bellcrank, which lost motion connection allows mechanical connection of said clutch pedal and said bellcranck independent of said valve.

5. A valve means according to claim 4 and further comprising a means resisting operation of said valve to open said inlet port to said outlet port, which means also aids in returning said clutch pedal to its normal non-energized position.

6. A valve means according to claim 1 and further comprising a means to resist operation of said valve member to provide feel in said manual control member and to restore said valve member when said manual control member is released including:
- a first spring operatively connected between said valve member and said valve housing; and
- a second spring operatively connected between said valve housing and said valve control rod.

References Cited by the Examiner
UNITED STATES PATENTS

| | | | |
|---|---|---|---|
| 2,137,522 | 11/38 | Lauer | 121—41 |
| 2,144,854 | 1/39 | Roy | 121—41 |
| 2,244,829 | 6/41 | Dick | 121—41 |
| 2,273,989 | 2/42 | Price | 121—41 |
| 3,060,899 | 10/62 | May et al. | 121—41 |

FRED E. ENGELTHALER, *Primary Examiner.*
RICHARD B. WILKINSON, *Examiner.*